United States Patent [19] | [11] Patent Number: 4,838,916
Edahiro et al. | [45] Date of Patent: Jun. 13, 1989

[54] METHOD FOR MAKING SINGLE-POLORIZATION, SINGLE MODE OPTICAL FIBERS

[75] Inventors: Takao Edahiro; Tetsuo Miya; Yutaka Sasaki; Katusunari Okamoto; Masao Kawachi, all of Mito, Japan

[73] Assignee: Nippon Telegraph & Telephone Public Corporation, Tokyo, Japan

[21] Appl. No.: 115,606

[22] Filed: Oct. 29, 1987

Related U.S. Application Data

[60] Continuation of Ser. No. 817,525, Mar. 31, 1986, abandoned, which is a division of Ser. No. 720,161, Apr. 5, 1985, abandoned, which is a continuation of Ser. No. 339,638, Jan. 15, 1982, abandoned.

[30] Foreign Application Priority Data

Jan. 17, 1981 [JP] Japan .................................. 56-4587

[51] Int. Cl.$^4$ .............................................. C03B 37/25
[52] U.S. Cl. ........................................ 65/3.11; 65/3.2; 65/13
[58] Field of Search ........................ 65/3.1, 3.11, 3.12, 65/3.2, 18.2, 144

[56] References Cited

U.S. PATENT DOCUMENTS

| | | | |
|---|---|---|---|
| 3,157,726 | 11/1964 | Hicks, Jr. et al. | 65/3.2 |
| 3,646,472 | 2/1972 | Cooper et al. | 65/3.2 |
| 3,720,312 | 11/1975 | Siegmund | 65/3.2 |
| 4,199,335 | 4/1980 | Gliermoth et al. | 65/2 |
| 4,227,771 | 10/1980 | Wolan | 65/3.2 |
| 4,295,869 | 10/1981 | Shiraishi et al. | 65/3.12 |
| 4,351,658 | 9/1982 | Olshansky | 65/3.2 |
| 4,360,371 | 11/1982 | Blankenship et al. | 65/3.12 |
| 4,395,270 | 7/1983 | Blankenship et al. | 65/3.11 |
| 4,455,267 | 6/1984 | Strahan et al. | 65/2 |

OTHER PUBLICATIONS

"Single Polarization Optical Fibers: Exposed Cladding Technique", V. Ramaswany et al, Appl. Phys. Lett. 33(4) 11/1/78, pp. 814–816.

*Primary Examiner*—Robert L. Lindsay
*Attorney, Agent, or Firm*—Blakely, Sokoloff, Taylor & Zafman

[57] ABSTRACT

A single-polarization single-mode optical fiber comprises a core made of silica glass, a clad surrounding the core and made of silica glass having a smaller index of refraction than the glass comprising the core, a pair of stress applying members symmetrically disposed on the clad and made of silica glass having different thermal expansion coefficient from that of the clad, spacers interposed between the stress applying members and made of silica glass having substantially the same thermal expansion coefficient as the clad, and a jacket surrounding the spacers, stress applying members. The jacket is also made of silica glass and has a smaller expansion coefficient than the stress applying members. The optical fiber of this invention has an excellent polarization preserving characteristic, low loss, long length, and stable characteristics.

18 Claims, 5 Drawing Sheets

F I G.3
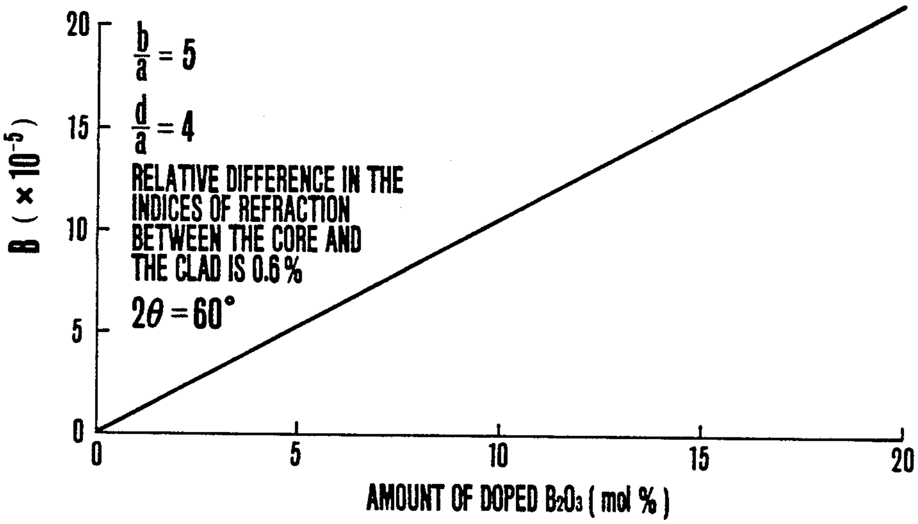
F I G.4
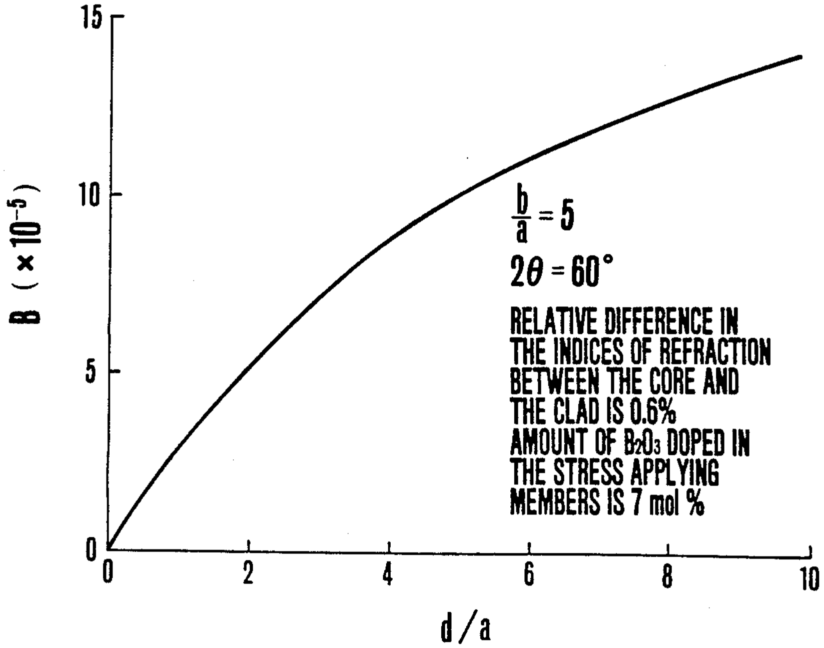

METHOD FOR MAKING SINGLE-POLORIZATION, SINGLE MODE OPTICAL FIBERS

This is a continuation of application Ser. No. 817,525 filed Mar. 31, 1986 which is a divisional of Ser. No. 720,161 filed Apr. 5, 1985 which is a continuation of Ser. No. 339,638 filed Jan. 15, 1982, all now abandoned.

BACKGROUND OF THE INVENTION

This invention relates to a single-mode optical fiber, and more particularly to an improvement of an optical fiber having a single-polarization characteristic.

Various types of optical fibers and methods of manufacturing the same have been proposed, that can propagate light polarized in a definite direction by providing a difference between propagation constants $\beta x$ and $\beta y$ of the modes propagating in orthogonal directions, that is by imparting a polarization preserving characteristic to the fiber. However, until today an optical fiber having an excellent polarization preserving characteristic, low loss and a long length is not yet available.

For example, in order to obtain a single-polarization, single-mode optical fiber, the core is shaped to have an elliptical cross-sectional configuration to afford the polarization preserving characteristic. An optical fiber having such a construction is prepared by grinding opposing surfaces of a rod shaped preform comprising a core and a cladding with a modified chemical vapor deposition (MCVD) method to form parallel ground surfaces, then applying a jacket onto the ground preform for adjusting the core diameter and then draw or elongate the jacketed preform by heating the preform at a temperature above 2000 degrees in centigrade in a heating furnace. More particularly, for drawing, the jacketed preform is heated so that the viscosity of the assembly is lowered and the drawn fiber would have a circular surface owing to surface tension. Consequently, due to the change of the shape of the flat portions, the completed fiber will have an elliptical cross section. Since the elliptical cladding has different wall thickness around its periphery and since the thermal expansion coefficient of the cladding is larger than that of the jacket, stress is applied to the core thereby producing an optical fiber having a polarization preserving characteristic.

An optical fiber having such construction is disclosed in a V. Ramaswamy et al paper of the title "Single Polarization Optical Fibers: Exposed cladding technique", Applied Physics Letter Vol. 33, No. 9, Nov. 1, 1978, pages 814–816.

However, in an ordinary optical fiber, the light propagating through the core more or less diffuses into the cladding (for example, about 15–25%) so that the fiber is liable to be influenced by the contained in the cladding. With the construction described above, however, since the thickness of the cladding is not uniform, it is difficult to obtain an optical fiber having a polarization preserving characteristic and a low loss characteristic.

Since a portion of the elliptical cladding having a large thermal expansion coefficient and extending in the minor axis direction partially cancels the stress induced by the cladding and extending in the direction of the major axis of the ellipse, the polarization preserving characteristic is degraded.

Furthermore, as a process that mechanically grinds the side surfaces of the preform in the longitudinal direction is used, the working accuracy is not uniform. This makes it difficult to obtain a long optical fiber. Such grinding fractures the preform during the grinding step, thus decreasing the yield of satisfactory product.

SUMMARY OF THE INVENTION

Accordingly, it is a principal object of this invention to provide a single-polarization single-mode optical fiber having an excellent polarization preserving characteristic and a method of manufacturing the same.

Another object of this invention is to provide a single-polarization single-mode optical fiber having a low loss characteristic in addition to the above mentioned characteristics and a method of manufacturing the same.

Still another object of this invention is to provide a single-polarization single-mode optical fiber having a long length as well as the advantageous characteristics described above and a method of manufacturing the same.

A further object of this invention is to provide a novel method of manufacturing a single-polarization single-mode optical fiber having desired characteristics with relatively simple manufacturing steps and without using any troublesome treatment.

A still further object of this invention is to provide a novel method of manufacturing a single-polarization single-mode optical fiber with desired characteristics by smaller number of manufacturing steps.

To accomplish these and other objects, according to this invention, on the outside of a cladding concentrically surrounding a substantially circular core are disposed stress applying member having a thermal expansion coefficient different from that of the cladding, and fillers or spacers on the outer portions of the cladding where the stress applying members are not applied. The assembly is then surrounded by a jacket.

With this construction, a stress is applied to the core and the cladding due to the difference in the thermal expansion coefficients of the cladding and the stress applying members with the result that a birefringence occurs between the core and the cladding, thus providing a single-mode optical fiber having a single-polarization characteristic.

According to this invention there is provided a single-polarization single-mode optical fiber comprising a core member made of a single silica glass having a first index of refraction; a cladding member substantially uniformly surrounding the core member and constituted by a silica glass having a second index of refraction smaller than that of the core member; a stress applying member locally disposed on an outer periphery of the cladding member and made of silica glass having different thermal expansion coefficient from that of the cladding member; a spacer member made of silica glass having substantially the same thermal expansion coefficient as the cladding member and disposed on the outer periphery of the cladding member adjacent the stress supplying member, and a jacket member surrounding the spacer member and the stress applying member, the jacket member being also made of silica glass having a smaller thermal expansion coefficient thant the stress applying member.

According to another aspect of this invention, there is provided a method of manufacturing a single-polarization single-mode optical fiber comprising the steps of preparing a core-cladding assembly including a core member made of silica glass having a first index of refraction, and a cladding member substantially uniformly surrounding the core member and made of silica glass having a second index of refraction smaller than the first index of refraction; locally disposing a stress applying member on an outer periphery of the core-cladding assembly, the stress applying member being made of silica glass having a thermal expansion coefficient different from that of the cladding member; disposing a spacer on the periphery of the core-cladding assembly adjacent the stress applying member; the spacer being made of silica glass having substantially the same thermal expansion coefficient as the cladding member; applying a jacket member about the spacer member and the stress applying member to surround the same, the jacket member being made of glass having a thermal expansion coefficient smaller than that of the stress applying member, and drawing a resulting assembly to fuse together the core, cladding, stress applying member, spacer and jacket members into an integrated optical fiber.

BRIEF DESCRIPTION OF THE DRAWINGS

In the accompanying drawings:

FIG. 3 is a graph showing the relation between the amount of $B_2O_3$ doped into silica glass comprising the stress applying members utilized in the optical fiber shown in FIG. 1 and the birefringence;

FIG. 4 is a graph showing the relation between the ratio of the radial thickness of the stress applying members utilized in FIG. 1 to the core radius and the birefringence;

DESCRIPTION OF THE PREFERRED EMBODIMENTS

Figure 1:
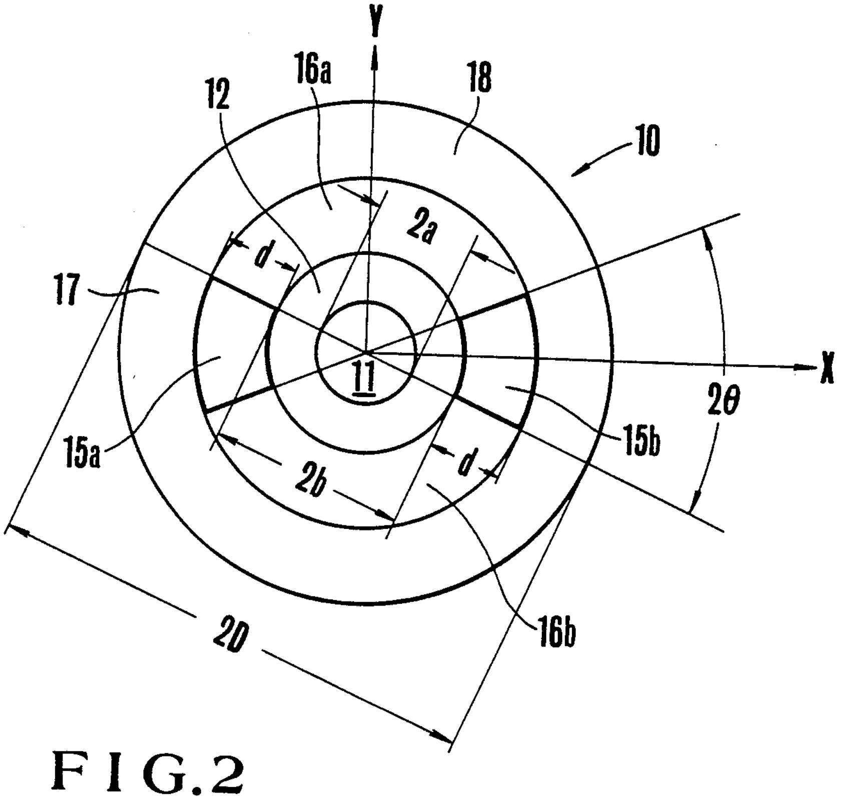
FIG. 1 is a cross-sectional view showing one embodiment of the single-polarization signle-mode optical fiber according to this invention.

Referring now to FIG. 1 which shows a preferred embodiment of the single-polarization single-mode optical fiber, an optical fiber 10 comprises a core 11 and a cladding 12 substantially concentric therewith. As an example of combinations of the materials comprising the core 11 and cladding 12, the following combinations are illustrated.

1. $GeO_2$—$SiO_2$:$SiO_2$
2. $P_2O_5$—$Si\mathit{o}2$:$SiO_2$
3. $GeO_2$—$P_2O_5$—$SiO_2$:$SiO_2$
4. $GeO_2$—$SiO_2$; F—$SiO_2$
5. $SiO_2$:F—$SiO_2$ It will be noted that in any combination of the core and cladding, the index of refraction of the cladding should be smaller than that of the core. The core 11 has a diameter of about 4.8 microns, for example about 4.8 microns and a cladding 12 having an outer diameter of 25 microns is disposed to surround the core 11. Such core 11 and cladding 12 are prepared by a well known synthesizing method such as a VAD method or a MCVD method.

According to this invention a pair of sector shaped stress applying members 15*a* and 15*b* each having a thickness of 12.5 microns are disposed on the periphery of an optical fiber consisting of the core and cladding described above, symmetrically with respect to the axis of the fiber. These stress applying members 15*a*, 15*b* are made of material having the same or slightly different index of refraction as that of the adjacent cladding and having a larger thermal expansion coefficient than that of the cladding. The reason for using such material is as follows. One reason is to apply a stress to the glass fiber due to thermal expansion to create strain in the core 11 and the cladding 12 so as to make the indecies of refraction of the core and cladding in a direction in which the stress applying members 15*a* and 15*b* are arranged to be different from the indices of refraction of other portions. To vary the indices of refraction by applying stress is well known as disclosed in K. Brugger "Effect of thermal stress on refractive index in cladd fibers. Appl. Opt. Vol. 10, 1971, P. 437.

Another reason lies in that, since the stress applying members 15*a* and 15*b* are disposed adjacent to the cladding 12, it is necessary to prevent diffusion of light which is propagating through the cladding 12 to the stress applying members. For this reason it is advantageous that the stress applying members should have an index of refraction close as far as possible to that of the cladding. This can be accomplished by suitably selecting the glass compositions of the core and cladding. Thus, since silica ($SiO_2$) is usually used as the material for the core and cladding, it is advantageous that the stress applying members 15*a* and 15*b* should have the same or substantially the same index of refraction as that of the silica glass.

Typical examples of the composition of the stress applying members 15*a* and 15*b* are as follows:

1. $GeO_2$—$B_2O_3$—$SiO_2$
2. $GeO_2$—F—$SiO_2$
3. $P_2O_5$—F—$SiO_2$
4. $P_2O_5$—$B_2O_3$—$SiO_2$
5. $B_2O_3$—$SiO_2$
6. $GeO_2$—$P_2O_5$—F—$SiO_2$
7. $TiO_2$—F—$SiO_2$ $GeO_2$, $B_2O_3$, F and $P_2O_5$ of these compositions are compounds that are used for increasing the thermal expansion coefficient of the stress applying member beyond that of the silica glass. When used in a predetermined quantity $TiO_2$ lowers the thermal expansion coefficient. Other compounds that are effective to increase the thermal expansion coefficient are PbO, $Al_2O_3$, ZrO, etc.

Among these compounds $GeO_2$, $P_2O_5$, $TiO_2$, PbO, $Al_2O_3$ and ZrO operate to increase the index of refraction of the stress applying members beyond that of the silica glass while $B_2O_3$ and F function to decrease the index of refraction. Accordingly by suitably combining these compounds it is possible to form a material having substantially the same index of refraction as that of $SiO_2$.

In this embodiment, the stress applying members are made of $B_2O_3$—$SiO_2$. The subtend angles of these stress applying members 15*a* and 15*b* are 60 degrees respectively.

Fillers or spacers 16*a* and 16*b* are symmetrically disposed adjacent the portions of the periphery at which the stress applying members 15*a* and 15*b* are not disposed. These fillers 16*a* and 16*b* have substantially the same radial thickness as those of the stress applying members 15*a* and 15*b*. Thus the fillers are shaped.

For these fillers 16*a* and 16*b* are used a material having substantially the same characteristics as the cladding 12 of the optical fiber 14. For example, this material is silica glass. Because different from the stress applying members 15*a* and 15*b*, the fillers 16*a* and 16*b* should not apply stress to the cladding and core.

A jacket 18 is then applied to completely surround the stress applying members 15*a* and 15*b* and the fillers 16*a* and 16*b*. The optical fiber thus formed has an outer diameter of 125 microns and its cut-off wavelength is 1.1 microns when the relative difference in the indecies of refractions of the core 11 and the cladding 12 is 0.6%.

In this example, the spacers 16*a* and 16*b* have substantially the same thermal expansion coefficient as the cladding, while the jacket 18 has a smaller thermal expansion coefficient than the stress applying members.

Denoting the propagation constants in the X and Y axis directions of light in $HE_{11}$ mode polarized in the direction of the major axis of the cross-section of the optical fiber by $\beta x$ and $\beta y$ respectively, the modal birefringence B is given by the following equation:

$$B=(\beta x-\beta y)/k \quad (1)$$

where $k=2\pi/\lambda$, and $\lambda$ represents the wavelength of light in vacuum.

Where the core 11 takes the form of a true circle, the birefringence caused by the stress applying members 15*a* and 15*b* is equal to the modal birefringence and expressed by $$B=P(\sigma x-\sigma y) \quad (2)$$

where P represents the photoelastic coefficient of the core 11 which is expressed by the following equation where ordinary silica glass is used $$P=3.36\times10^{-5}\ (mm^2/km)$$

Doped silica glass has substantially the same value of P. $\sigma x$ and $\sigma y$ represent the main stress components (in $kg/mm^2$) in the main axis direction and X, Y direction.

Figure 2:
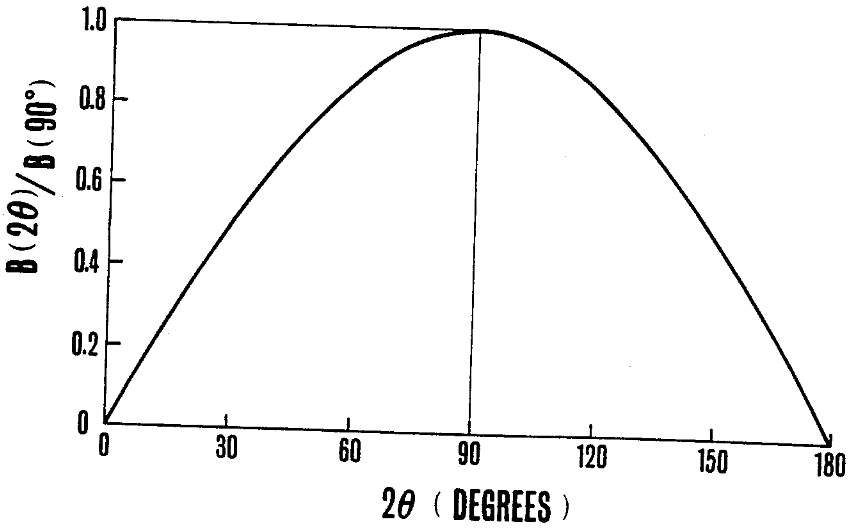
FIG. 2 is a graph showing the relation between an angle 2$\theta$ subtended by a stress applying member utilized in the optical fiber shown in FIG. 1 and the birefringence.

Denoting the subtend angles of the stress applying members 15*a* and 15*b* by $2\theta$ respectively, the birefringence B would be shown by FIG. 2. The value of $B(2\theta)$ for B(90°) at $2\theta=90°$ becomes a maximum at $2\theta=90°$ and parabolically and gradually increases from $2\theta=0$ to $2\theta=90°$. Beyond $2\theta=90°$, the value of $B(2\theta)$ parabolically decreases. Such decrease in the birefringence B beyond $2\theta=90°$ is attributable to the fact that the birefrigence caused by the stress applying members located at $2\theta=0$ to 90° is cancelled by the stress applying preforms disposed at portions where $2\theta$ is larger than 90°. For this reason, the angle $2\theta$ subtended by the stress applying members 15*a* and 15*b* is advantageously to be less than 90°. But as can be noted from FIG. 2, immediately after exceeding $2\theta=90°$, the percentage of decrease in the birefringence is small so that even when the stress applying members are disposed at positions where the value $2\theta$ exceeds slightly beyond 90° there is no practical problems. In this case, however, the polarization preserving characteristic degrades slightly.

Where the stress applying members 15*a* and 15*b* are made of $B_2O_3$—$SiO_2$, the modal birefringence B varies greatly depending upon the amount of incorporation of $B_2O_3$. This characteristic is shown in FIG. 3. Because the thermal expansion coefficient $\rho(x)$ varies as shown by the following equation in accordance with the amount of incorporation (x mol %) of $B_2O_3$ $$\rho(x)=(x)\times10^{-7}+(5.5)\times10^{-7}(1/°C.) \quad (3)$$

where $(5.5)\times10^{-7}/°C.$ represents the thermal expansion coefficient of undoped silica glass but as the stress applying members 15*a* and 15*b* are surrounded by the cladding 12 and the jacket 18 which are made of silica glass the thermal expansion coefficient of the stress applying members would be cancelled by those of the other portions. As a consequence, the thermal expansion coefficient included in $\rho(x)$ does never affect the birefringence in the present case.

FIG. 3 is a graph showing the relationship between the birefringence B and the amount of incorporation of $B_2O_3$ into the stress applying members 15*a* and 15*b* where $b/a=5$, $d/a=4$ and the difference in the indice of refraction of the core 11 and the cladding 12 is 0.6% and $2\theta=60°$ in which a represents the radius of the core 11, b the outer radius of the cladding 12 and d the thickness of the stress applying members 15*a* and 15*b*. As can be noted from FIG. 3, the variation in the birefringence B with respect to the quantity of $B_2O_3$ added is substantially proportional. Advantageous amount of incorporation of $B_2O_3$ was found to be about 20 mol %.

The result of experiment showed that the characteristic shown in FIG. 3 can also be obtained when other dopants were incorporated into the stress applying member 15*a* and 15*b*. However, it should be noted that the relation between the thermal expansion coefficient and the quantity of the dopant added varies depending upon the type of the dopant.

FIG. 4 shows the relationship between a ratio d/a between the thickness d of the stress applying preforms and the radius a of the core, and the birefringence B. The characteristic shown in FIG. 4 was obtained when $b/a=5$, $2\theta=60°$, and indecies of refraction of the core 11 and the cladding 12 are 0.6% respectively, and the amount of incorporation of $B_2O_3$ into the stress applying members is 7 mol %. As can be noted from FIG. 4, the birefringence B tends to monotonously increase with the increase in the ratio d/a. The characteristic shown in FIG. 4 also shows that in a region in which the ratio d/a exceeds 10 the birefringence B tends to saturate.

The normalizing frequency V that determines the characteristic of the single mode optical fiber is generally given by the following equation.

$$V=\frac{2\pi a}{\lambda}\sqrt{(n_1^2-n_2^2)} \quad (4)$$

where $n_1$ represents the index of refraction of the core 11, and $n_2$ that of the cladding 12.

In order to obtain a single mode optical fiber, the value of V must be smaller than 2.405.

In a region in which $V>2.405$, since lights of higher order mode propagate the fiber becomes a multimode fiber. For example, where $n_1-n_2/n_1=0.0006$, in order to satisfy the condition of equation (4) $\lambda=1.1$ microns, $2a=5.26$ microns.

Where $b/a=5$, then $$a+b+d=a(1+5+10)=16a=84 \text{ microns.}$$

Consequently, the diameter of the optical fiber 2D should be about 160 microns at a minimum.

When the ratio d/a is increased beyond 10, the diameter 2D of the optical fiber increases further thus loosing the utility thereof.

On the other hand, where the ratio d/a is made to be less than 2, the birefringence B becomes smaller than $(5)\times10^{-5}$ thus degrading the polarization preserving characteristic.

When the optical fiber is bent to have a radius of 10 mm, a result of calculation shows that the resulting birefringence B would be about $10^{-6}$ so that when considering the influence created when the glass fiber is fabricated into a cable, in a region in which $B<5\times10^{-5}$, a satisfactory characteristic can not be obtained.

Figure 5:
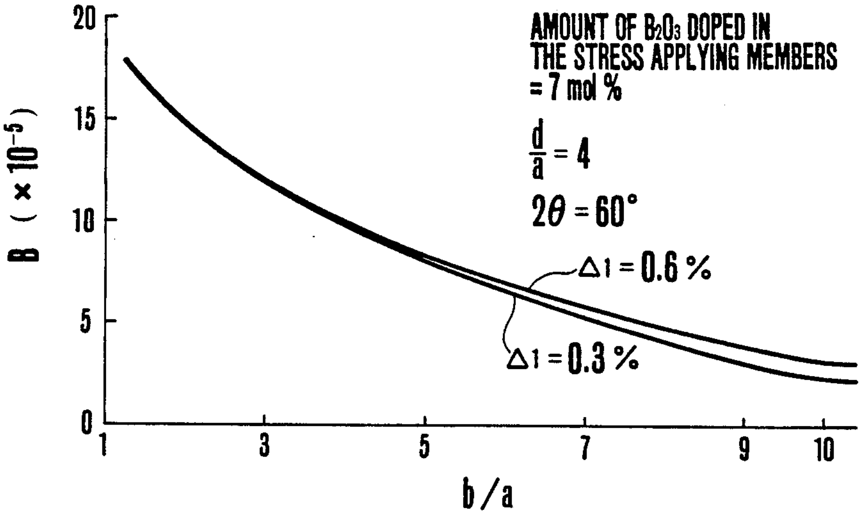
FIG. 5 is a graph showing the relation between the ratio of the cladding diameter to the core diameter of the optical fiber shown in FIG. 1 and the birefringence.

FIG. 5 shows the relationship between the ratio of core diameter 2*a* to the cladding diameter 2*b* and the birefringence B. As shown, the birefringence B monotoneously decreases with the increase in the ratio b/a and becomes about $(4)\times10^{-5}$ where $b/a=9$ and the difference between the indecies of refraction of the core 11 and the cladding 12 is about 0.6%. As the ratio b/a increases beyond 10 the birefringence B decreases, thus degrading the polarization preserving characteristic whereby the characteristic of the single-polarization single-mode optical fiber. On the other hand, when the ratio b/a is decreased, the light propagating through the optical fiber expands to the stress applying numbers 15*a* and 15*b* so that the light would be influenced by the infrared ray absorption loss of $B_2O_3$ contained in the stress applying members 15*a* and 15*b*.

Figure 6:
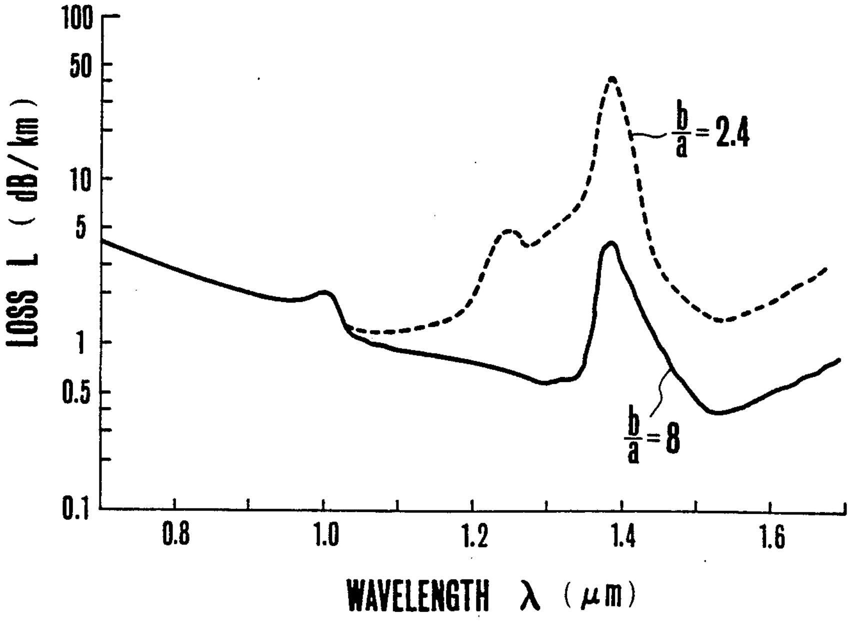
FIG. 6 shows the loss characteristic of an optical fibers of this invention in which the ratio of cladding diameter to core diameter is different.

FIG. 6 shows spectral loss characteristics of two optical fibers having different ratios b/a, in which the broken line shows a case of $b/a=2.4$, while the solid line a case of $b/a=8$. These characteristics shows that where $b/a=2.4$, the loss L of the optical fiber considerably increases at a wavelength longer than 1.2 microns. The result of analysis made on various values of the ratio b/a including the result shown in FIG. 6 shows that the optical fiber of this invention having a ratio $b/a<2$ increases its loss to an extent that prevents practical use of the optical fiber as a light communication transmission medium.

Use of the single-polarization single-mode optical fiber of this invention results in various advantages as follows.

(1) As above described, since in the optical fiber of this invention stress applying members are locally disposed adjacent to the outer periphery of the optical fiber consisting of concentric core and cladding, that is adjacent the cladding to apply a local stress to the core and cladding so as to obtain the polarization preserving characteristic, the optical fiber of this invention has more excellent polarization preserving characteristic and lower loss than the prior art optical fiber.

(2) As the stress applying members are locally disposed on the outer periphery of the cladding at the portions of the outer periphery of the cladding at which the stress applying members are not disposed are covered by spacers this construction provides sufficiently large polarization preserving characteristic.

(3) Furthermore, since the optical fiber consisting of the core and cladding is made of glass and since the stress applying members are located remote from the core it is possible to obtain a single-polarization single-mode optical fiber having a long length and a low loss.

One example of the method of manufacturing the single-polarization single-mode optical fiber will now be described with reference to FIGS. 7A through 7E.

At first, an optical fiber preform comprising a core glass and a cladding is prepared by a well known vapor phase axial deposition method (VAD). For example, the core diameter is 7 mm, the cladding outer diameter is 42 mm and the ratio of cladding outer diameter to the core diameter is 6. The core has a composition of $GeO_2$—$SiO_2$, while the cladding is made of $SiO_2$. Accordingly, the difference in the relative difference of indecies of refraction between the core and cladding is $\Delta n=0.7\%$.

The optical fiber preform thus formed is elongated by passing it through a fiber drawing device or an elongation apparatus to reduce its outer diameter to 8 mm. After elongating, the diameter of the core is about 1.3 mm, thus maintaining the original ratio.

Figure 7A:
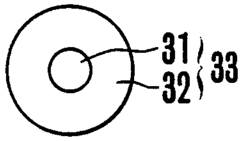
FIGS. 7A through 7E show successive steps of manufacturing a single polarization single mode optical fiber according to the method of this invention.

FIG. 7A shows the cross-section of the elongated core 31 and the cladding 32. Then the stress applying members are formed by a modified chemical vapor deposition method (MCVD). The resulting stress applying members are made of doped silica glass each having an outer diameter of 7.8 mm. $B_2O_3$ (15 mol %) and $GeO_2$ (4 mol %) are used as the dopants. A cover having an outer diameter of about 12 mm and made of silica glass is applied to surround the core and the stress applying members.

Figure 7B:

The assembly is then drawn to reduce its outer diameter to 5 mm. At this time, the core made of the doped silica glass has an outer diameter of aout 3.2 mm. FIG. 7B shows the resulting assembly 35 in which the core is designated by 35*a* which the core is designated by 35*a* and the stress applying member by 35*b*. In this example, the number of the elongated stress applying members is 4 but it should be understood that this number may be varied if necessary.

The stress applying members are made of silica glass doped with either one or plurality of members selected from the group consisting of $GeO_2$, $B_2O_3$, $P_2O_5$, $TiO_2$, F, $Al_2O_3$, $ZrO_2$, $Sb_2O_5$ and having a thermal expansion coefficient larger or smaller than that of ordinary silica glass or cladding and a softening point lower than that of the ordinary silica glass or cladding. The cover surrounding the stress applying members is made of silica glass.

Figure 7C:
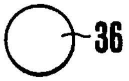
Figure 7D:
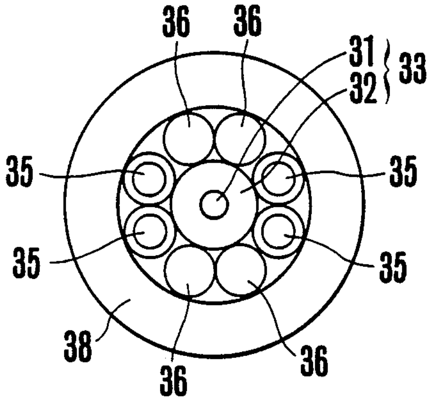

Then, fillers or spacers 36 having substantially the same thermal expansion coefficient as the cladding are prepared. Each of the spacers 36 has substantially the same thermal expansion coefficient as the cladding and can be produced by elongating a silica glass rod to reduce its diameter from 10 mm to 5 mm. In this example four spacers 36 are used and one of the spacer 36 is shown in FIG. 7C.

Pairs of stress applying members 35 are disposed symmetrically about the center of the elongated core-cladding assembly 33. A plurality of spacers 36 (in this example 2) each comprising silica glass rod having an outer diameter of 5 mm are disposed at portions of the outer periphery of the cladding 32 where the stress applying members are not disposed.

Thereafter, the assembly is inserted into a jacket silica glass tube 38 having an outer diameter of 33 mm, and as inner diameter of 18.5 mm. The jacket tube 38 has a thermal expansion coefficient smaller than that of the stress applying members.

The assembled state is shown in FIG. 7. The assembly is then put into an evacuated carbon resistance furnace maintained at a temperature of 2100° C., and then drawn to have an outer diameter of 125 microns. The fiber drawing apparatus is disclosed for example is M. Nakahara, S. Sakaguchi and T. Miyashita "Optical fiber drawing techniques". Tsuken. Jippo, Vol. 26, No. 9, 1977, p. 2557.

Figure 7E:
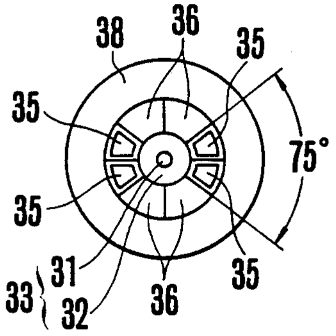

The cross-section of the resulting optical fiber is shown in FIG. 7E. As a result of the drawing step the spacers 36 and the stress applying members 35 disposed on the outer periphery of the core-cladding assembly 33 are deformed thus converting the spacers into sector segment shapes. As a conseqnence, spaced apart stress applying members 35 similar to those shown in FIG. 1 would be formed on the outer surface of the cladding 32. The angle subtended by each stress applying member 35 is acute, and each having a predetermined thickness.

As a result of observation of the completed optical fiber under a scanning type electron microscope, the followings were found.

core diameter: 4.9 microns.

The wavelength at which the mode becomes the single-mode, whose condition is determined by the normalizing frequency $$V\left(=\frac{2\pi a}{\lambda}\sqrt{n_1^2-n_2^2}\right.,$$

where λ represents the wavelength, $n_1$ the index of refraction of the core 31 and $n_2$ that of the cladding at which V becomes 2.405, was 1.1 microns. The optical fiber was wound 10 times about a cylinder having a radius of 2 cm and a loss peak was noted near 1.1 microns by the measurement by means of the transfer loss wavelength measuring system. This shows that as a result of bending of the optical fiber, high order modes have been scattered as radiation modes. When such depant as $B_2O_3$ is added to silica glass, the softening temperature is generally lower than that of the silica glass. Since its viscosity coefficient at the temperature of drawing, for example 2100° C. is lower than that of the silica glass so that after drawing the stress applying members have a sector shape as shown in FIG. 7E. The optical fiber thus obtained has a loss of 0.7 dB/km and 0.5 dB/km respectively at wavelength of 1.3 microns and 1.55 microns. When expressed in terms of the birefringence (evaluated by a beat length) the polarization preserving characteristic per 1 km of the optical fiber is about $8\times10^{-5}$, which is sufficiently high for practical use. The angle subtended by each stress applying member is $2\theta=75°$.

Since in this embodiment, the stress applying members are prepared with MCVD method the effective area occupied by each stress applying member is decreased. But when a $GeO_2$—$B_2O_3$—$SiO_2$ glass rod is used the areas occupied by the stress applying members can be widened. As a consequence, it is possible to increase the calculated value of the birefringence by 1.5 times of that of the embodiment described above.

Another example of the method of manufacturing a single-polarization single-mode optical fiber of this invention will now be described with reference to FIGS. 8A and 8B.

At first, a core-cladding assembly 43 made up of a core 41 and a cladding 42 is prepared with vapor phase axial deposition (VAD) method. At this time, the outer diameter of the core-cladding assembly is 30 mm. When this assembly is heat drawn in the same manner as in the aforementioned embodiment, the outer diameter of the core is 4 mm and that of the cladding is 0.8 mm. $SiO_2$ incorporated with 5 mol % of $GeO_2$ is used for the core 41 and an ordinary silica glass is used for the cladding 42.

In the same manner, the stress applying members 45 are prepared with VAD method. Each of the stress applying members 45 comprises a doped/silica glass rod incorporated with 4 mol % of $GeO_2$ and 10 mol % of $B_2O_3$. Each one of the as manufactured stress applying members 45 has an outer diameter of about 2.5 mm, and drawn in the same manner as the core-cladding assembly to reduce its diameter to 3 mm. 6 such stress applying members are used.

Further, sector spaped fillers or spacers 46 are prepared. Each spacer 46 is made of quartz glass and has an inner diameter of 4.0 mm, an outer diameter of 7 mm and a subtend angle of 115°. In this embodiment two such spacers are used.

Furthermore, a cylindrical jacket 48 made of silica glass and having an inner diameter of 7.5 mm and an outer diameter of 17 mm is prepared.

After preparing the component elements described above, a pair of three stress applying members 45 is symmetrically disposed on the outer surface of the cladding 42, the cladding 42 and the core 41 constituting a core-cladding assembly 43.

Then, the assembly is inserted into a jacket tube 48. Thereafter, fillers 46 are symmetrically disposed on the portions of the cladding 42 in which the stress applying members 45 are not disposed. This state is shown in FIG. 8A.

The resulting assembly is heated to a temperature of 2100° C. and then drawn with a well known drawing device.

Figure 8A:
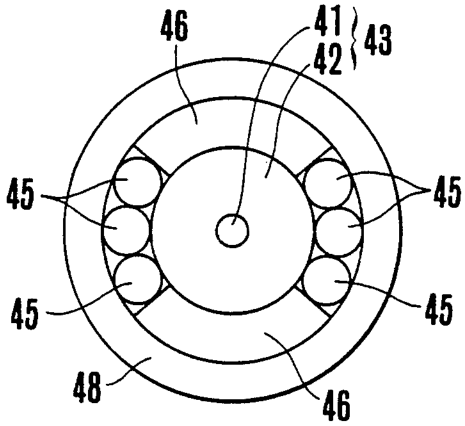
FIGS. 8A and 8B show another example of the method of manufacturing the optical fiber of this invention.
Figure 8B:
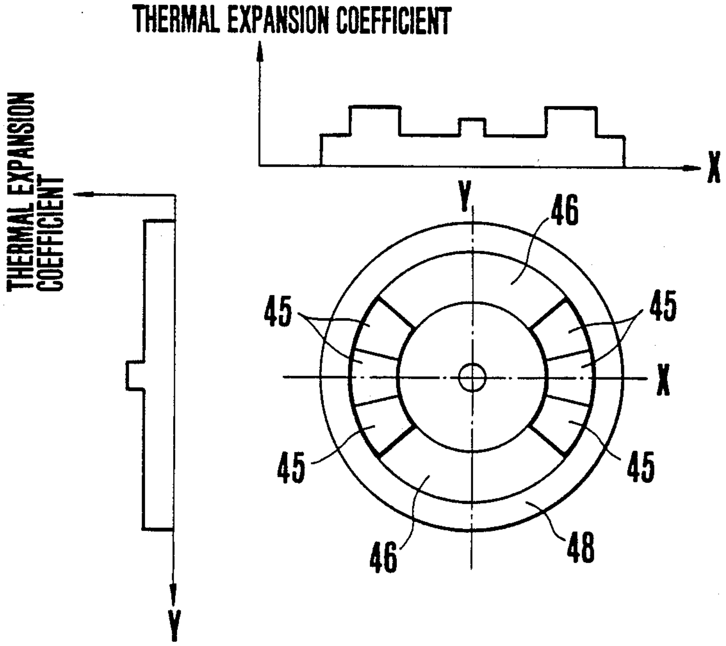

FIG. 8B shows the sectional construction of the elongated optical fiber.

In this optical fiber, since all of the cladding 42, jacket 48 and fillers 46 are made of silica ($SiO_2$) glass, its thermal expansion coefficient is small, for example $5.5\times10^{-7}$/°C. However, since the stress applying members 45 are made of doped silica glass incorporated with 4 mol % of $GeO_2$ and 10 mol % of $B_2O_3$ its thermal expansion coefficient is high, for example $(20)\times10^{7}$/°C. The $SiO_2$ incorporated with $GeO_2$ and $B_2O_3$ has lower softening temperature than not doped $SiO_2$.

Consequently, when the optical fiber is drawn after it has been heated to about 2100° C., the stress applying members 45 solidify subsequent to the solidifiction of the cladding 42 and fillers 46. Since the stress applying members 45 have a large thermal expansion coefficient it shrinks greater than the silica glass when cooled. Consquently, at the later stage of cooling, already solidified cladding 43 and the fillers 46 tend to be pulled toward the stress applying members 45 thereby creating a tension stress about the stress applying members 45. The stress reaches the core 41 and the cladding 42 to apply a tension to the core. Due to the photoelastic effect, the stress acting upon the core 41 and the cladding 42 lowers the index of refraction of the core and the cladding. And in the direction perpendicular to the stress applying members, there occurs little tension. These effects induce large unti-symmetricity in the index profile.

FIG. 8B shows thermal expansion coefficient destributions in the X and Y directions. As shown, since the stress applying members 45 are disposed at diametrically opposite positions with respect to the core 41, the variation in the index of refraction induced in the core 41 due to the difference in the thermal expansion coefficient is produced in the direction of the stress applying members 45. The variation in the index of refraction induced when the ratio of the cladding outer diameter to the core diameter is about 5 is $(1)\times 10^{-4}$, thus providing a sufficiently large birefringence.

Of course in this example, the index of refraction $n_1$ of the core 41, the index of refraction $n_2$ of the cladding 42, the outer diameter $2a$ of the core 41 and the wavelength $\lambda$ of the light are selected such that equation (4) satisfies a condition $V \leqq 2.405$.

In the embodiment shown in FIGS. 8A and 8B the stress applying members 45 may be made of doped silica glass having a composition of $GeO_2$—$B_2O_3$—$SiO_2$ and disposed on the periphery of the core shown in FIG. 7B.

Where the stress applying members as shown in FIG. 7B are used, these members are separated from each other like islands, it was found that the value of the birefringence is comparable to that obtained with the construction shown in FIGS. 8A and 8B.

As above described, the method of this invention has the following advantages.

(1) This method does not require grinding work and core and cladding can be made with synthesizing method. Further, after disposing stress applying members and spacers on the outer periphery of the cladding the jacket is applied. Thus these steps are simple and the method corresponds to a so-called rod-in-tube method.

(2) Further, according to this invention, an optical fiber can be manufactured by a combination of well known steps and yet can obtain high quality optical fibers at a high yield.

It should be understood that the invention is not limited to the specific embodiments described above and that many changes and modification will be obvious to one skilled in the art. For example as dopant to be incorporated into the stress applying members for increasing their thermal expansion coefficient, either one of BaO, CaO, $Y_2O_3$ and MgO or combination thereof can be used. However, when using these dopants, it is necessary to select their quantities in a range not causing crystallization.

Furthermore, in the foregoing embodiment a core was surrounded by a cladding, an intermediate layer may be interposed between the core and the cladding. Due to nonuniform productivity, the core may not always be a true circle.

Instead of making the thermal expansion coefficient of the stress applying members to be larger than that of the cladding. This relation may be reversed so as to produce a compressive force, only essential consideration being to apply stress or strain to the core and cladding. To reverse the relative thermal coefficient, quartz glass dopes with $TiO_2$ can be used.

Instead of symmetrically arranging the stress applying members with respect to the axis of the core, the stress applying member may be disposed only on a portion of the periphery of the core. When a member having a larger thermal expansion coefficient and a member having a smaller thermal expansion coefficient than the cladding are alternately arranged on the outer periphery of the cladding, it is possible to increase birefringence.

Instead of applying a jacket after disposing spacers and stress applying members on the outer periphery of the cladding as has been described with reference to FIGS. 7A–7E, spacers and stress applying members may be successively inserted into the jacket. Alternatively, after disposing the stress applying members on the cladding and applying a jacket thereon, the spacers may be inserted into the jacket with any method, the construction of the finished optical fiber is the same.

What is claimed is:

1. A method of manufacturing a single-polarization single-mode optical fiber comprising the steps of:

preparing a core-cladding assembly including a core member made of silica glass having a first index of refraction, and a cladding member substantially uniformly surrounding said core member and made of silica glass having a second index of refraction smaller than said first index of refraction;

applying a jacket member about said cladding member to surround the same, said jacket member being made of silica glass;

disposing at least one stress applying member comprised of silica glass between an outer periphery of said cladding member and said jacket, wherein each of said stress applying members is disposed at discrete intervals about said outer periphery of said cladding member; and drawing a resulting assembly to bond together said core, cladding, stress applying members and said jacket into an integral optical fiber;

wherein said stress applying members cause material stresses in said core so as to change the optical properties of said optical fiber.

2. The method of claim 1, wherein there are two stress applying members, said members being diametrically opposed about said outer periphery of said cladding member.

3. The method of claim 2 wherein said cladding members have a first coefficient of thermal expansion, said stress applying members have a second coefficient of thermal expansion, and said jacket has a third coefficient of thermal expansion, and wherein said first and second coefficients of thermal expansion are different from each other and said second coefficient of thermal expansion is greater than said third coefficient of thermal expansion.

4. The method according to claim 3 wherein said stress applying members have a larger thermal expansion coefficient than said clad member.

5. The method according to claim 3 wherein said stress applying members each comprise a stress applying piece and a cover member surrounding the same.

6. The method according to claim 5 wherein each said stress applying piece has a thermal expansion coefficient different from of that of said cladding member and said jacket member has substantially the same thermal expansion coefficient as said cover member.

7. The method according to claim 3 wherein a ratio of outer diameter of said core member to outer diameter of said cladding member amounts to 2 through 10.

8. The method according to claim 3 wherein the glass utilized to form said core member has a composition selected from a group consisting of $GeO_2$—$SiO_2$, $P_2O_5$—$SiO_2$, $GeO_2$—$P_2O_5$—$SiO_2$ and $SiO_2$.

9. The method according to claim 3 wherein said glass utilized to form said cladding member is selected from a group consisting of $SiO_2$, F—$SiO_2$, $P_2O_5$—$SiO_2$, and $P_2O_5$—F—$SiO_2$.

10. The method according to claim 3 wherein said stress applying members are doped with a material having a larger thermal expansion coefficient than said cladding member.

11. The method according to claim 3 wherein said stress applying members are doped with a material having a smaller thermal expansion coefficient than said clad member.

12. The method according to claim 10 wherein said doped material is selected from a group consisting of $GeO_2$, $P_2O_5$, PbO, $Al_2O_3$ and $ZRO_2$.

13. The method according to claim 11 wherein said doped material is $TiO_2$.

14. The method according to claim 3 wherein said stress applying members are doped with an additional material which brings an index of refraction of said stress applying members close to that of silica glass.

15. The method according to claim 14 wherein said additional material is selected from a group consisting of $B_2O_3$ and F.

16. The method according to claim 3 wherein said jacket member is made of silica glass ($SiO_2$).

17. The method according to claim 3 wherein said stress applying members are made of a material having an index of radiation substantially the same as that of said cladding member.

18. The method according to claim 3 wherein said index of refraction is substantially the same as that of the silica glass.

* * * * *

UNITED STATES PATENT AND TRADEMARK OFFICE

CERTIFICATE OF CORRECTION

PATENT NO. : 4,838,916

DATED : 06-13-89

INVENTOR(S) : Edahiro et al.

It is certified that error appears in the above-identified patent and that said Letters Patent is hereby corrected as shown below:

| Column | Line | Correction |
|---|---|---|
| 6 | 28 | delete "a", insert --a-- |
| 6 | 29 | delete "b", insert --b-- |
| 6 | 44 | delete "a", insert --a-- |
| 8 | 38 | delete "aout", insert --about-- |
| 10 | 23 | delete "quartz", insert --silica-- |

Signed and Sealed this

Tenth Day of April, 1990

*Attest:*

HARRY F. MANBECK, JR.

*Attesting Officer*

*Commissioner of Patents and Trademarks*

UNITED STATES PATENT AND TRADEMARK OFFICE
CERTIFICATE OF CORRECTION

PATENT NO. : 4,838,916

DATED : June 13, 1989

INVENTOR(S) : Edahiro, et al

It is certified that error appears in the above-identified patent and that said Letters Patent is hereby corrected as shown below:

Col. 6, line 29, delete "d" insert --$\underline{d}$--

Signed and Sealed this

First Day of January, 1991

Attest:

HARRY F. MANBECK, JR.

*Attesting Officer*      *Commissioner of Patents and Trademarks*